US008660045B2

(12) United States Patent
Lundström et al.

(10) Patent No.: US 8,660,045 B2
(45) Date of Patent: Feb. 25, 2014

(54) MOBILE CORE NETWORK NODE REDUNDANCY

(75) Inventors: Johan Lundström, Pargas (FI); Kari-Pekka Perttula, Espoo (FI); Klaus Turina, Herzogenrath (DE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 307 days.

(21) Appl. No.: 12/808,567

(22) PCT Filed: Dec. 17, 2007

(86) PCT No.: PCT/EP2007/064071
§ 371 (c)(1),
(2), (4) Date: Dec. 7, 2010

(87) PCT Pub. No.: WO2009/077002
PCT Pub. Date: Jun. 25, 2009

(65) Prior Publication Data
US 2011/0096724 A1    Apr. 28, 2011

(51) Int. Cl.
*H04B 7/00* (2006.01)
*H04W 4/00* (2009.01)

(52) U.S. Cl.
USPC ............................................. 370/310; 370/328

(58) Field of Classification Search
USPC .................... 370/310, 328, 352; 709/227
See application file for complete search history.

(56) References Cited

U.S. PATENT DOCUMENTS

| 6,097,951 A * | 8/2000 | Ernam et al. | 455/433 |
| 6,775,373 B2 * | 8/2004 | Stoughton | 379/219 |
| 2007/0165516 A1 * | 7/2007 | Xu et al. | 370/217 |

FOREIGN PATENT DOCUMENTS

| RU | 2272363 C2 | 3/2006 |
| WO | 03017586 A1 | 2/2003 |

OTHER PUBLICATIONS

Ericsson L.M., "3G UP package in 29.232, addition to Relay Function description", 3GPP TSG-CN4, CN#06 Meeting, Tdoc NJ-010112, Jan. 15-19, 2001, pp. 1-7, Beijing, China.
Ong, L. et al. "An Introduction to the Stream Control Transmission Protocol (SCTP)." Network Working Group, Request for Comments: 3286, Category: Informational, May 2002.
Author Unknown. "IP Core Pooling—Enhanced User Experience & Improved Profitability." Ericsson Tutorial, Aug. 2006.
Author Unknown. "Softswitch in Mobile Networks." Ericsson White Paper, Apr. 2005.

* cited by examiner

*Primary Examiner* — Abdullah Riyami
*Assistant Examiner* — Brian Cox
(74) *Attorney, Agent, or Firm* — Coats and Bennett, P.L.L.C.

(57) ABSTRACT

Apparatus configured to operate within a communication network as a pool proxy, routing signalling traffic between a node of a first network and one of a set of pooled nodes within a second network. The apparatus is further configured to operate in one of an active state and a passive state towards the first network node and, when in said active state to send a heartbeat signal to at least one of said pooled nodes for relaying to a peer pool proxy and, when in said passive state, to receive a heartbeat signal from a peer pool proxy relayed via at least one of said pooled nodes. In the event that no heartbeat signal is received when in the passive state, the apparatus is configured to activate itself as pool proxy towards the first network node.

28 Claims, 5 Drawing Sheets

MOBILE CORE NETWORK NODE REDUNDANCY

TECHNICAL FIELD

The present invention relates to the provision within a network for node redundancy using a node pool and a pool sharing proxy. The invention is applicable in particular, though not necessarily, to the effective provision of a pool of Mobile Switching Centre nodes within the circuit switched core of a mobile telecommunication system.

BACKGROUND

In a conventional second generation mobile communication network, each geographical cell of the network is served by a Base Station Transceiver (BST) which provides the network side of the air interface. A set of BSTs are physically connected to a Base Station Controller (BSC) which is in charge of the allocation of radio resources to subscribers. Each BSC is in turn physically connected to a Mobile Switching Center which is responsible for the routing of incoming and outgoing calls to the mobile network and is responsible, in particular, for handling the mobility of subscriber devices. In the case of a 3G network, so-called Node B's are broadly equivalent to the BSTs of the 2G network, whilst the Radio Network Controller (RNC) takes the place of the BSCs. Both 2G and 3G networks may comprise packet-switched core networks in addition to the circuit-switched core network. In the packet-switched network architecture, the MSC is replaced by the Serving GPRS Support Node (SGSN).

Figure 1:
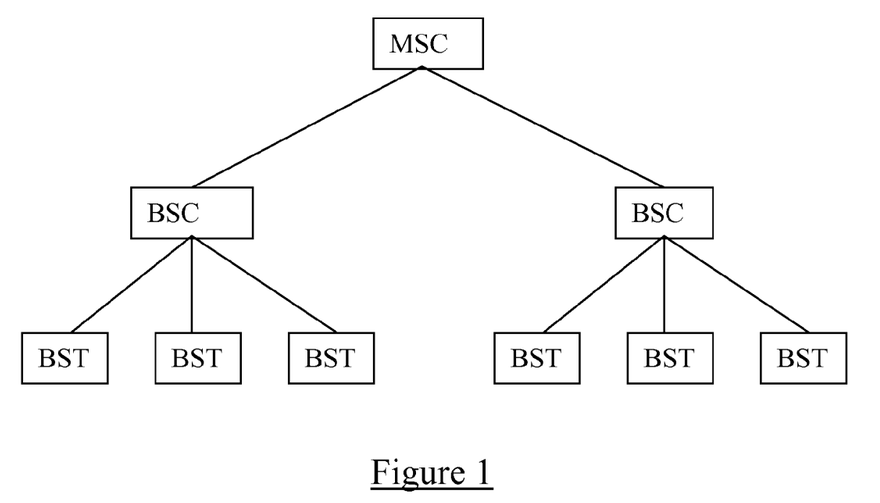
FIG. 1 illustrates schematically a simplified radio access network and core network architecture for a 2G/3G network.

Traditionally, vertically integrated networks have been built to deliver single services such as telephony or data access. FIG. 1 illustrates this vertically integrated architecture in the case of a 2G network. However, in order to increase the "modularity" of network components and therefore reduce network construction and operating costs, a solution sometimes known as the Mobile Softswitch Solution (MSS) architecture has been introduced. This architecture is described in an Internet published whitepaper titled "Efficient Softswitching", Ericsson A B, August 2006, which can be found at: http://www.ericsson.com/technology/whitepapers/8107_efficient_softswitching_a.pdf. Softswitching in combination with IP technology allows for a layered architecture approach according to which service execution, control and connectivity can be horizontally integrated across multiple access networks. Softswitches separate the call control and switching functions into different nodes, consequently separating control and connectivity layers.

As a particular example, the conventional MSC is split in the layered softswitch architecture into an MSC Server (MSC-S) which handles the control plane signalling and a Mobile Media Gateway (M-MGW) which handles user plane traffic. A Gateway Control Protocol (GCP) is used between the MSC-S and the M-MGW in order to allow the MSC to control user plane bearers. All GCP signalling messages are transported between the M-MGW and the MSC-S using a long-lived Stream Control Transmission Protocol (SCTP) association established between the two entities. Although the M-MGW does not make use of the control plane signalling as such, this signalling is relayed by the M-MGW en route from the BSC/RNC to the MSC-S. More particularly, it is possible to transport this signalling over a second SCTP association established between the M-MGW and the MSC-S.

Figure 2:
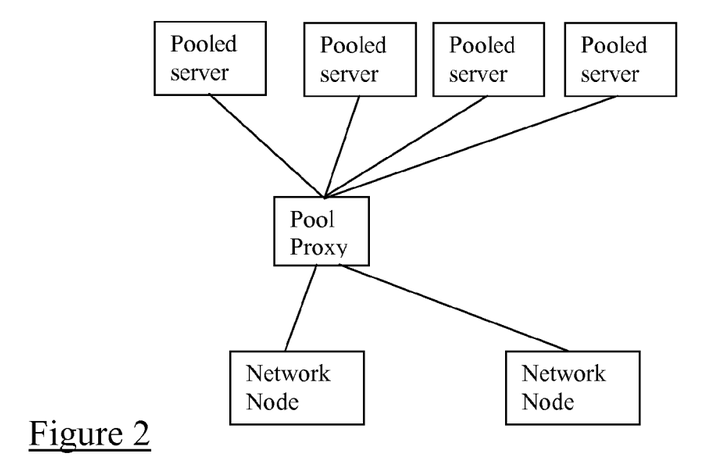
FIG. 2 illustrates schematically a generic server pool architecture in which a pool proxy is used to connect downstream network nodes to pool servers.

In today's advanced MSS networks, server pooling is the standardised concept to achieve geographical redundancy in the networks. This avoids inter alia the failure of a single server from resulting in a failure of the network to provide services to subscribers. A generalised MSS server pooling architecture is illustrated in FIG. 2. In the case of an MSC-S pool, it will be appreciated that if one MSC-S fails, BSCs/RNCs currently allocated to that MSC-S can be reallocated. In a pooled architecture, an MSC Pool Proxy can be introduced between the BSC/RNC and a pool of MSC-S in order to support BSCs/RNCs that do not support MSC-S pooling. This Pool Proxy acts as a single point of contact for BSCs/RNCs to the MSC-S pool. In more general terms a pool proxy is used to connect network nodes to pool nodes. Such pool nodes can be pool servers. Whilst the MSC Pool Proxy can be a standalone node, it is preferable to integrate this functionality into the M-MGW in order to save on operating costs.

Figure 3:
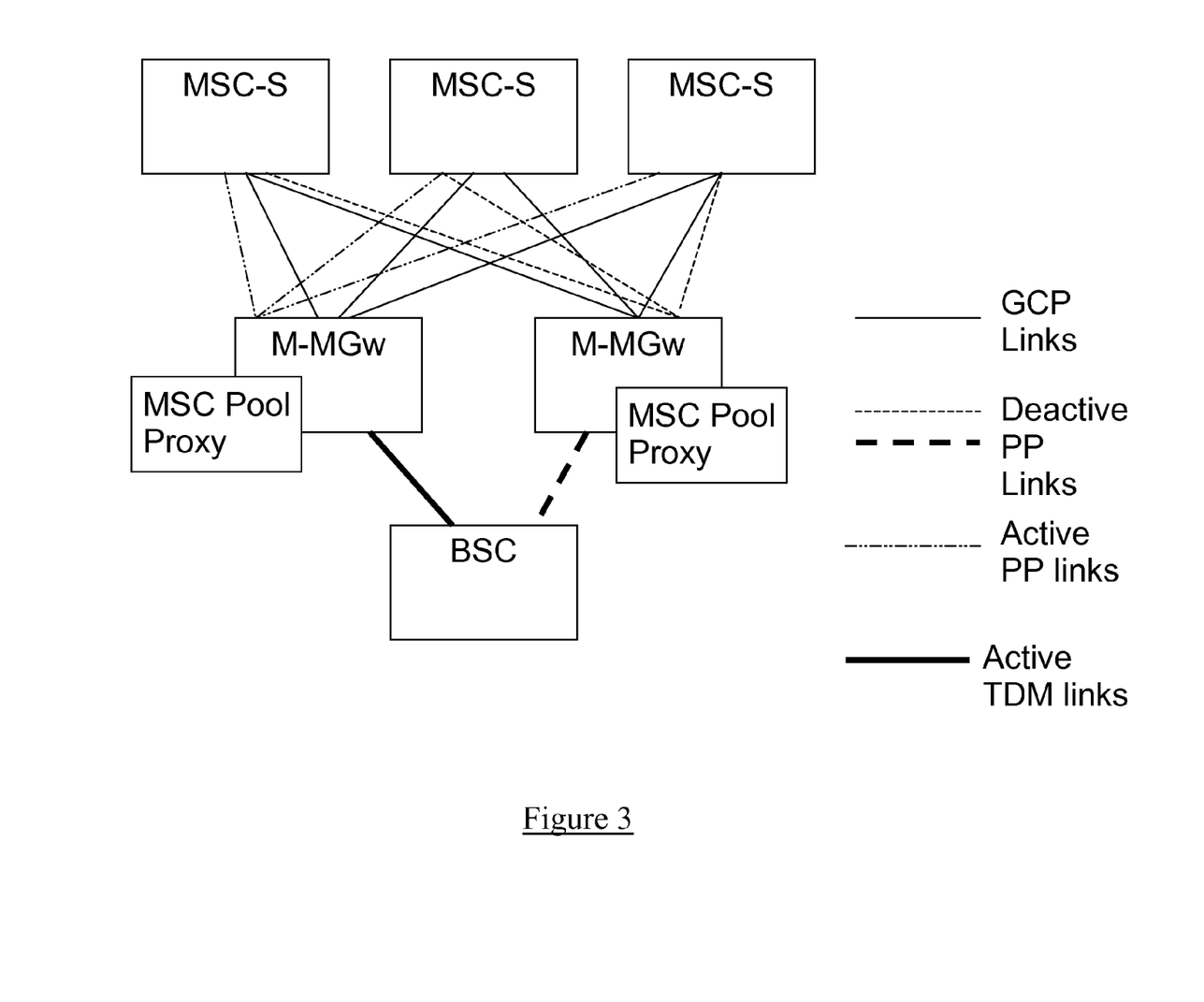
FIG. 3 illustrates schematically a Mobile Softswitch Solution architecture implemented within a 2G/3G network and in which pool proxies are co-located with M-MGWs.

The pooled approach to the provision of network nodes provides security against failure of an individual pooled node. However, a pool proxy itself constitutes an architectural element that is a critical point of failure. It is therefore desirable to introduce pool proxy redundancy into the architecture, for example as illustrated in FIG. 3 for the case of an MSC-S pool. One approach to this involves configuring each BSC/RNC to be able to independently address two (or more) pool proxies, where in this example the pool proxies are located at respective M-MGWs.

A BSC or RNC may be unaware of the presence of the pool proxy, with the BSC or RNC merely addressing the proxy using the Signalling Point Code (SPC) as if the proxy were a regular MSC. Such a BSC or RNC cannot separately address a plurality of pool proxies (or MSCs as the BSCs or RNCs see them).

A problem to be addressed therefore is how to introduce pool proxy redundancy into a network without giving rise to conflicting signalling on the interface between the pool proxies and the BSCs/RNCs or other network nodes.

SUMMARY

It is an object of the present invention to overcome or at least mitigate the problem noted above. This object is achieved by sending a heartbeat signal from an active pool proxy towards a passive pool proxy via the pooled nodes.

According to a first aspect of the present invention there is provided apparatus configured to operate within a communication network as a pool proxy, routing signalling traffic between a first node and one of a set of pooled second nodes, the apparatus being further configured to operate in one of an active state and a passive state towards the first node and, when in said active state to send a heartbeat signal to at least one of said pooled second nodes for relaying to a peer pool proxy and, when in said passive state, to receive a heartbeat signal from a peer pool proxy relayed via at least one of said pooled second nodes, wherein, in the event that no heartbeat signal is received or the received signal does not satisfy some minimum criterion, when in the passive state, the apparatus is configured to activate itself as pool proxy towards the first network node.

Embodiments of the invention allow a downstream node to be coupled to multiple pool proxies whilst at the same time allowing only one of the pool proxies to be visible at any given time. Thus, signalling conflicts can be avoided.

According to a second aspect of the present invention there is provided apparatus configured to operate within a communications network as one of a set of pooled second nodes serving one or more first nodes, the apparatus being further configured to receive a heartbeat signal from an active pool proxy and to relay the heartbeat signal to a passive pool proxy.

According to a third aspect of the present invention there is provided a method of providing redundancy within a communication network comprising two or more pool proxies routing signalling traffic between a first node and one of a set of pooled second nodes, the method comprising maintaining one of the pool proxies in an active state towards said first node and the other pool proxy in a passive state, sending a heartbeat signal (105) from the active pool proxy to the passive pool proxy via one or more of said pooled second nodes, and, in the event that the heartbeat signal is not received at the passive proxy, activating (104) that proxy towards the first node.

According to a fourth aspect of the present invention there is provided a method of providing redundancy within a communication network comprising two or more pool proxies routing signalling traffic between a first node and one of a set of pooled second nodes, the method comprising, at one of said pool proxies, maintaining (103) the proxy in a passive state towards said first node, receiving (101,102) a heartbeat signal from one or more of said pooled second nodes and, in the event that the heartbeat signal is not received, activating (104) the pool proxy towards said first node.

According to a fifth aspect of the present invention there is provided a method of providing redundancy within a communication network comprising two or more pool proxies routing signalling traffic between a first node and one of a set of pooled second nodes, the method comprising, at one of said pooled second nodes, receiving (202) a heartbeat signal from one of said pool proxies and relaying (203) the heartbeat signal to another of the pool proxies.

According to a sixth aspect of the present invention there is provided a computer program comprising computer program code means adapted to perform the method of the above aspects of the invention, when said program is run on a computer.

DETAILED DESCRIPTION

Referring to the Mobile Softswitch Solution (MSS) 2G architecture of FIG. 3 according to which each BSC (or RNC according to 3G) is connected to two Mobile Media Gateways (M-MGWs), an embodiment of the present invention will now be described. In this embodiment, the MSC Pool Proxies are implemented in M-MGWs. Furthermore, a BSC of this embodiment is unaware that it is connected to two M-MGWs/MSC Pool Proxies, as the links to these belong to the same link set. The BSC is configured with a single Signalling Point Code (SPC) which it uses over the GSM A interface (BSSAP protocol) to communicate with an MSC. As such, the BSC can be a legacy (e.g. GSM) BSC.

The current SS7 rules and standards only allow a BSC to address a single SPC. If the BSC is connected to two or more network nodes having the same SPC, the handling of Signalling Network Management (SNM) messages becomes impossible. A possible solution to this problem involves configuring two pool proxies with the same SPC, but ensuring that only one of these is active at any one time. Only in the event that the active pool proxy fails is the passive proxy activated. This is not to say however (in the case of the integrated M-MGW/MSC Pool Proxy) that the M-MGW at which a passive MSC Pool Proxy resides is also in a passive state. Indeed, assuming that the node is functioning normally, the media plane handling operations of the M-MGW will be active. As will be described, a heartbeat signal is sent from the active MSC Pool Proxy to the passive MSC Pool Proxy in order to control the state of the latter.

The active proxy could transmit the heartbeat via a direct link (such direct links are not currently implemented) to the passive proxy. As long as the heartbeat is received by the passive proxy, that proxy remains passive. Only if the heartbeat is not received does the passive proxy activate itself. A problem with this approach, i.e. sending a heartbeat via a direct link between the proxies, is that if the passive proxy does not receive a heartbeat, this could be due to a failure of the active proxy or because the direct link has gone down. In the latter case, the active proxy is still functioning and the activation of the passive proxy will result in the collision of messages and a possible service failure.

A solution to this problem will now be described, considering by way of example the MSS architecture of FIG. 3. It will be appreciated however that the invention can be applied to any pooled node architecture requiring pool proxy redundancy.

Within both the active and the passive MSC Pool Proxies, TDM signalling links are established with the BSC for the purpose of transporting BSSAP signalling, e.g. relating to mobility and connection management. These links are shown in FIG. 3. However, only the link to the active MSC Pool proxy is active. Stream Control Transmission Protocol (SCTP) is used in order to ensure the reliable transport of messages between each MSC Pool Proxy and the MSC-S pool. More particularly, one SCTP association is established between each Pool Proxy and each MSC-S. Again, these SCTP associations are fully active only for the active MSC Pool Proxy, whilst they are inactive in the case of the passive MSC Pool Proxy. Thus, no conflicts arise on the A interface. In addition to the BSSAP related SCTP associations, SCTP associations are established between each M-MGW and each of the pool MSC-Ss for the purpose of carrying the Gateway Control Protocol (GCP) signalling. These GCP related associations are active, even for the M-MGW in which a passive MSC Pool Proxy resides.

In order to allow the passive MSC Pool Proxy to be able to identify an effective failure of the active MSC Pool Proxy, due either to a failure of the active MSC Pool Proxy or a failure of the BSSAP related links between the active MSC Pool Proxy and the MSCs (which has the same result as a Pool Proxy failure), heartbeat signals are sent from the active MSC Pool Proxy to the passive MSC Pool Proxy via the MSC-Ss. In more general terms, the servers of the server pool relay the heartbeat signals from the active pool proxy to the passive pool proxy. Preferably, the heartbeat signals are transported between the active MSC Pool Proxy and the MSC-Ss over the BSSAP related SCTP associations, although as an alternative the GCP related SCTP associations may be used. Between the MSC-Ss and the passive MSC Pool Proxy, the heartbeat signals are transported over the GCP related SCTP associations using separately assigned SPCs for the MSC Pool proxies (or the same SPC used for the GCP signalling towards the M-MGW where the passive MSC Pool Proxy is located).

The heartbeat signal is typically a periodically transmitted message which conforms to some appropriate protocol. In one example, this might be a "ping" type message, i.e. not containing a payload. In another example, the heartbeat signal may consist of messages each containing the identity of the sending pool proxy and/or the identity of the relaying MSC-S and/or a timestamp (for security purposes). Rather than being set periodically, the messages making up the heartbeat signal may be "event" triggered. In this case, the passive MSC Pool Proxy may define a window within which it expects to receive a heartbeat message, resetting the timer each time a heartbeat message is received.

In order to guarantee that the heartbeat signals will be received by the passive MSC Pool Proxy even if only a single MSC-S has active connections with both the active and passive MSC Pool Proxies, the active MSC Pool Proxy sends the heartbeat signals on a round robin basis to the MSC-Ss. Other appropriate selection mechanisms may alternatively be used. For example, the Pool Proxy may select MSC-Ss at random, or use only a subset of all available MSC-Ss.

Following installation of the MSS architecture described here, one of the MSC Pool Proxies (PP A) is defined as active and the other (PP B) as passive. The passive proxy is configured to listen for a transmitted heartbeat signal and to remain passive as long as the heartbeat signal is received within some predefined minimum frequency and/or pattern. For example, the passive proxy may remain passive as long as heartbeat messages are received from at least one of the MSC-Ss and with some minimum frequency. However, if the expected heartbeat signal is not received, the passive MSC Pool Proxy shall activate itself as this will imply that either the active MSC Pool Proxy has failed or all of its links to the MSC-S pool have gone down (nb. the passive Pool Proxy is able to separately determine if its links to the MSC-Ss have failed). The activated MSC Pool Proxy now activates the BSSAP related SCTP associations towards the MSC-S pool, and the signalling links towards the BSC. It also begins sending its own heartbeat signals towards the "failed" MSC Pool Proxy via the MSC-S pool. As such, if the failed MSC Pool Proxy (or its links to the MSC-S pool) subsequently recovers, it will not reactivate itself.

Figure 4:
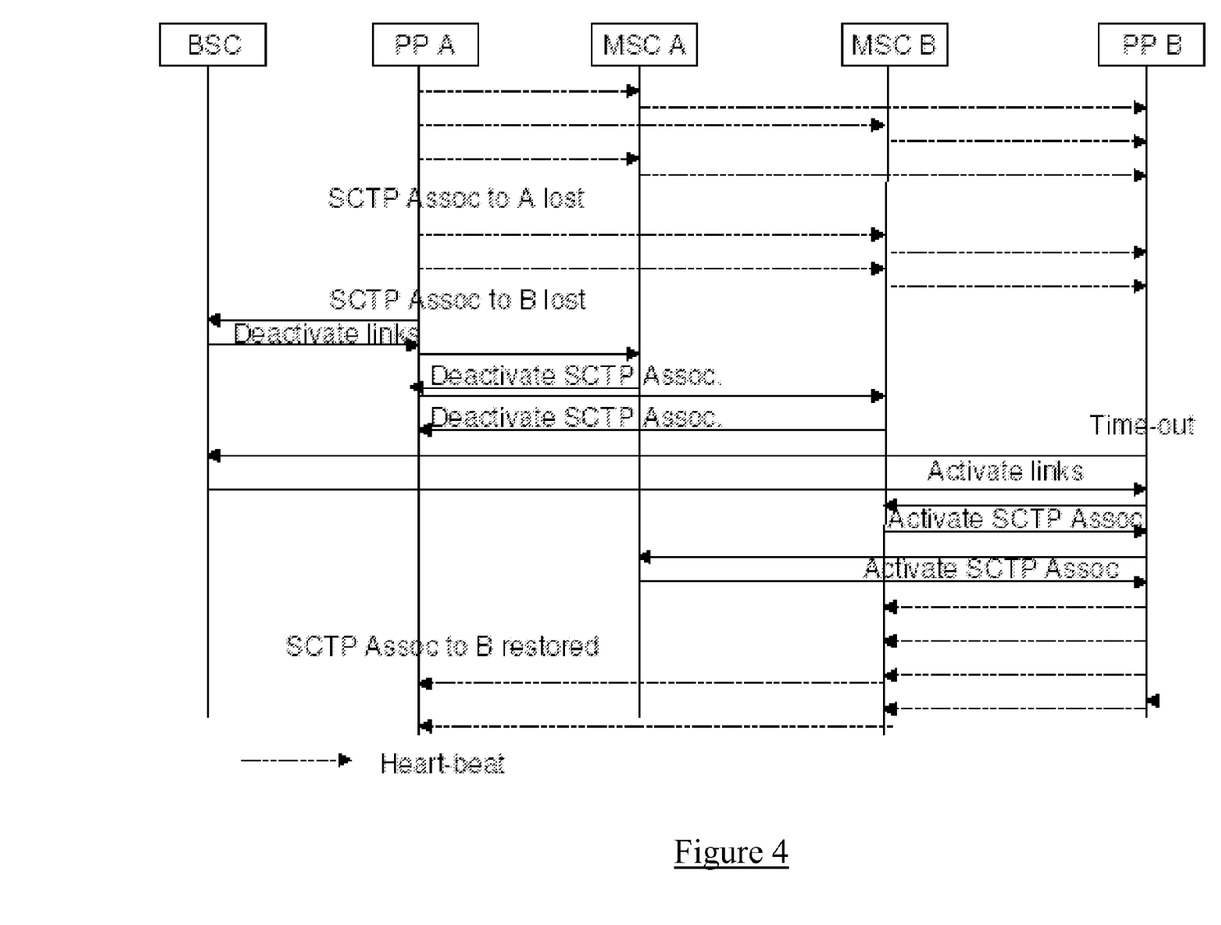
FIG. 4 illustrates signalling associated with controlling a passive and an active MSC Pool Proxy of an MSS architecture.

Signalling associated with a Pool Proxy failure is illustrated in FIG. 4, where in this simplified example the MSC-S pool consists of a pair of MSC-Ss, namely MSC A and MSC B. Initially, a first Pool Proxy (PP A) is active whilst a second Pool Proxy (PP B) is passive. PP A sends heartbeat messages towards MSC A and MSC B in turn, which relay the messages to PP B. PP B remains passive so long as the messages are received. Assume now that the SCTP association between PP A and MSC A is lost, but that the association between PP A and MSC B remains alive. In this case, heartbeat messages continue to be relayed to PP B via MSC B, and PP B remains passive. In the event that the SCTP association between PP A and MSC B is also lost, and assuming that PP A remains online (i.e. it is only the SCTP associations that are lost), as illustrated in the Figure PP A will deactivate its links to the BCS and its upstream SCTP associations. PP B notices now that no heartbeat messages are being received by it (timeout), and therefore switches to the active state. It activates its links to the BSC, activates the upstream SCTP associations to MSC A and MSC B, and starts sending heartbeat messages towards PP A.

In the event that a passive MSC Pool Proxy is restarted for any reason, or looses connectivity (including the GCP connections), it will by default remain in the passive state when it recovers, unless of course it does not receive the heartbeat signal (according to the predefined threshold policy), indicating a failure of the active proxy or associated GCP links, in which case it is activated.

The relaying of heartbeat messages in the MSC-Ss can be done either via M3UA Relay or SCCP Relay. In the case of M3UA Relay, heartbeat messages are relayed using SPCs, while in the case of SCCP Relay Sub-system Numbers and Global Titles may also be used for routing.

Figure 5:
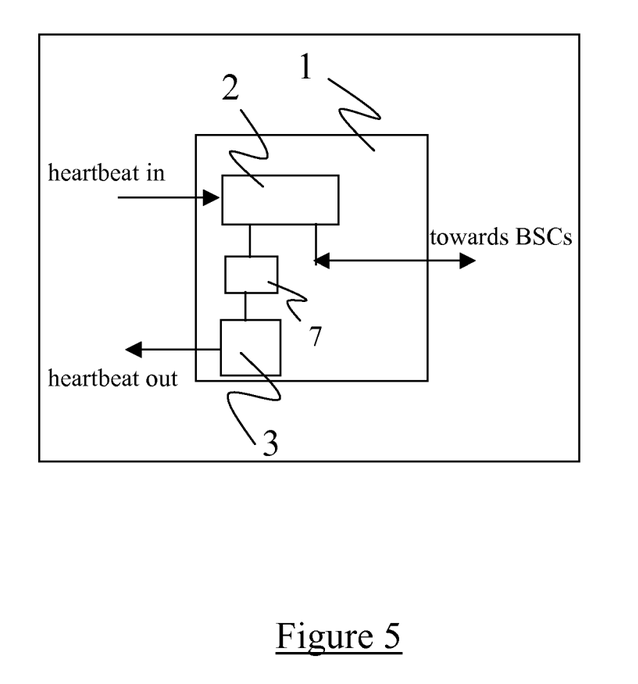
FIG. 5 illustrates schematically an MSC Pool Proxy according to an embodiment of the present invention.
Figure 6:
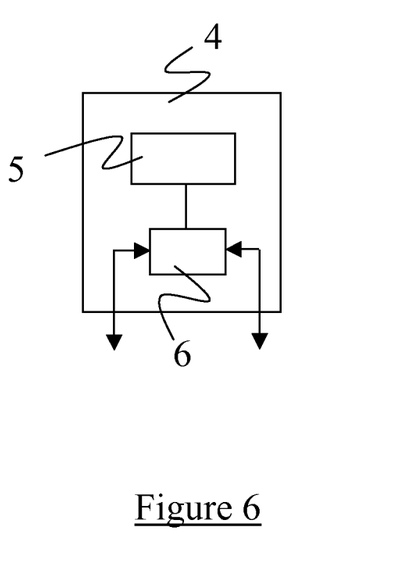
FIG. 6 illustrates schematically an MSC server according to an embodiment of the present invention.

FIG. 5 illustrates schematically the structure of an MSC Pool Proxy 1 for use within the network architecture described above. A controller 2 is arranged in the passive operating state to receive heartbeat signals from pool MSC servers. In the event that the controller fails to receive the heartbeat signal, indicating a failure of the active proxy or associated GCP links, it operates a switch 3, turning on a heartbeat signal generator 7 to provide an output heartbeat signal. The controller 2 activates its MSC Pool Proxy, establishing and controlling the necessary links and SCTP associations. FIG. 6 illustrates schematically an MSC-S 4 for use within the described architecture. This comprises a controller 5 for controlling inter alia a switch 6 which receives a heartbeat signal from one of the pool proxies and relays it to the other.

Figures 7, 8:
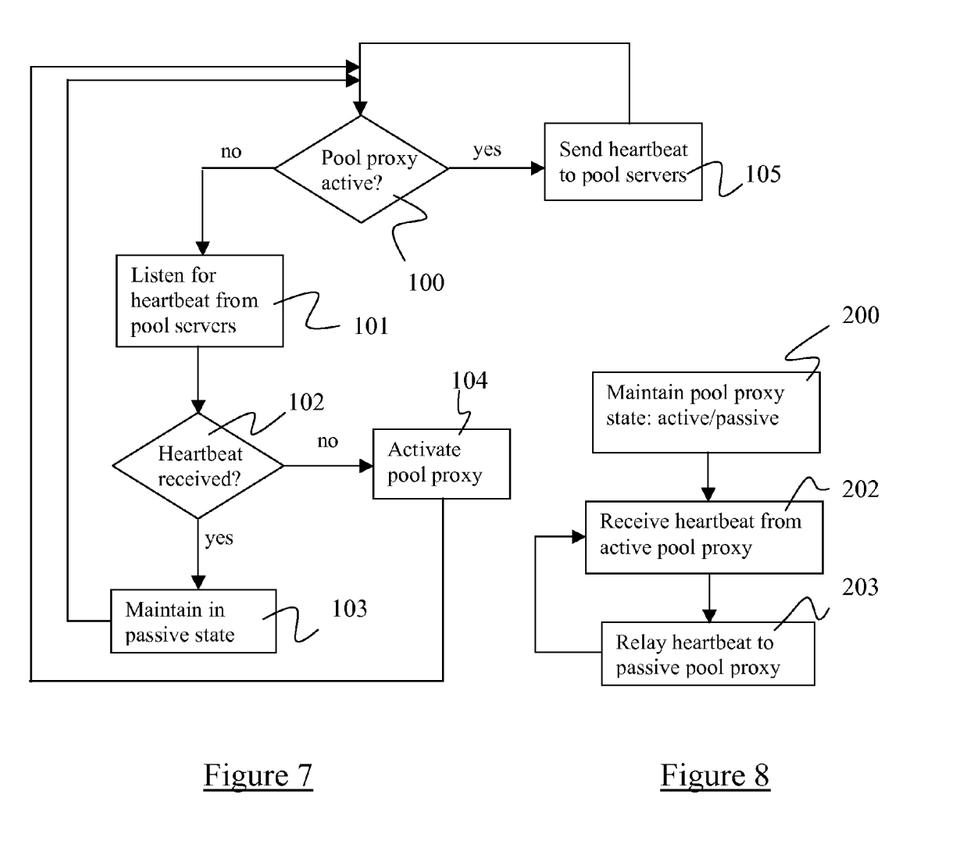
FIG. 7 is a flow diagram illustrating the operation of the MSC Pool Proxy of FIG. 5.
FIG. 8 is a flow diagram illustrating the operation of the MSC server of FIG. 6.

FIG. 7 illustrates a method of operating the pool proxy. The method begins with the pool proxy determining whether it is in an active state or passive state (block 100). If the pool proxy is in a passive state, it listens for a heartbeat signal from the active pool proxy which is relayed via the pooled second nodes (block 101). If a heartbeat signal is received, the pool proxy maintains itself in the passive state (block 103). If, after expiration of a predetermined time period, no heartbeat signal is received (block 102), the pool proxy transitions to the active state and becomes the active pool proxy (block 104). If, at block 100, it is determined that the pool proxy is in the active state, the pool proxy sends a heartbeat signal to the pool proxy via the pooled second nodes (block 105).

FIG. 8 illustrates operation of the pooled server nodes. The pooled server nodes maintain the pool proxy state as active or passive (block 200). The server node receives a heartbeat signal from the active pool proxy (block 202) and relays the heartbeat signal to the passive pool proxy (block 203).

It will be appreciated that the methods illustrated in FIGS. 7 and 8 may be implemented by way of a computer program running on appropriate hardware platforms.

Whilst the invention has been described above with reference to provision of an MSC-S pool, it will be appreciated that the principles are applicable in general to any scenario where a pool of nodes are served by two or more pool proxies and where proxy redundancy is required. It is only relevant that the heartbeat signal is relayed from an active pool proxy to a passive pool proxy via one or more of the pool nodes.

It will be appreciated by those of skill in the art that various modifications may be made to the above described embodiments without departing from the scope of the present invention. For example, whilst the above discussion has been concerned with a 2G architecture, the invention is applicable to a 3G architecture in which the BSCs are replaced by RNCs, and the RANAP protocol is used in place of the BSSAP protocol. The invention is also applicable to a SGSN Pool Proxy network architecture in which BSCs/RNCs are connected to an SGSN pool via two (or more) Pool Proxies. In this case, the heartbeat signals between the Pool Proxies and the SGSNs would be carried via dedicated signalling links.

The invention claimed is:

1. A pool proxy, for a communication network, the pool proxy comprising a processing circuit and being configured to:
   route signaling traffic between a radio access network node and one of a set of pooled core network nodes;
   operate in one of an active state and a passive state towards the radio access network node;
   when in the active state, to send a heartbeat signal to at least one of the pooled second core network nodes for relaying to a peer pool proxy; and
   when in the passive state, to receive a heartbeat signal from a peer pool proxy relayed via at least one of the pooled core network nodes;
   wherein, when the pool proxy is in the passive state, in the event that no heartbeat signal is received or the received heartbeat signal does not satisfy some minimum criterion, the pool proxy is configured to activate itself as pool proxy towards the radio access network node;
   wherein the radio access network node comprises one of a Base Station Controller and a Radio Network Controller; and
   wherein the set of pooled core networked nodes comprises one of a set of pooled Mobile Switching Centre (MSC) Servers (MSC-Ss) and a set of pooled Servicing General Packet Radio Service (GPRS) Support Nodes (SGSNs).

2. The pool proxy of claim 1, wherein the set of pooled core network nodes comprises a set of pooled MSC-Ss, and wherein the pool proxy is being configured to operate as a Mobile Switching Center pool proxy, routing signaling traffic between the radio access network node and the set of pooled MSC-Ss.

3. The pool proxy of claim 2, the pool proxy being further configured to operate as a Mobile Media Gateway and to communicate with each the MSC-Ss as Media Gateway Controller using a Gateway Control Protocol.

4. The pool proxy of claim 3, wherein in the active state, the pool proxy is configured to convey the heartbeat signal to the pooled core network node(s) via a Stream Control Transmission Protocol association, and wherein the Stream Control Transmission Protocol association is shared with a Gateway Control Protocol interface.

5. The pool proxy of claim 3, wherein in the active state, the pool proxy is configured to convey the heartbeat signal to the pooled core network node(s) via a Stream Control Transmission Protocol association, and wherein the Stream Control Transmission Protocol association is shared with an interface for carrying control signaling to and from the radio access network node.

6. The pool proxy of claim 3, wherein in the passive state, the pool proxy is configured to receive the heartbeat signal from the pooled core network node(s) via a Stream Control Transmission Protocol association, the Stream Control Transmission Protocol association being shared with a Gateway Control Protocol interface.

7. The pool proxy of claim 1, wherein the set of pooled core network nodes comprises a set of pooled SGSNs, and wherein the pool proxy is configured to operate as a SGSN pool proxy, routing signaling traffic between a Base Station Controller or the radio access network node and the set of pooled SGSNs.

8. The pool proxy of claim 1, wherein the active state, the pool proxy is configured to convey the heartbeat signal to the pooled core network node(s) via a Stream Control Transmission Protocol association.

9. The pool proxy of claim 1, wherein in the passive state, the pool proxy is configured to receive the heartbeat signal from the pooled core network node(s) via a Stream Control Transmission Protocol association.

10. The pool proxy of claim 1, the pool proxy being configured to send and receive individual heartbeat messages of a heartbeat signal via ones of the pooled second nodes on a round robin basis.

11. A core network node in a communication network serving one or more radio access network nodes, the core network comprising one of a set of pooled core network nodes, the core network node further comprising a processing circuit and being further configured to:
   receive signaling from the radio access network nodes via an active pool proxy; and
   receive a heartbeat signal from the active pool proxy and to relay the heartbeat signal to a passive pool proxy;
   wherein the radio access network node comprises one of a Base Station Controller and A Radio Network Controller; and
   wherein the set of pooled core networked nodes comprises one of a set of pooled Mobile Switching Centre (MSC) Servers (MSC-Ss) and a set of pooled Servicing General Packet Radio Service (GPRS) Support Nodes (SGSNs).

12. The core network node of claim 11, wherein the core network node is configured to relay the heartbeat signal via one of a Message Transfer Part Level 3 User Adaptation Layer (M3UA) or Signaling Connection Control Part (SCCP) relay.

13. The core network node of claim 11, wherein the core network node is a MSC-S.

14. The core network node of claim 13, wherein the core network node is configured to operate as a Media Gateway Controller using a Gateway Control Protocol to control Media Gateways implemented at both the passive and active pool proxies.

15. The core network node of claim 14, wherein the core network node is configured to convey the heartbeat signal to the passive pool proxy via a Stream Control Transmission Protocol association, and wherein the Stream Control Transmission Protocol association is shared with a Gateway Control Protocol interface.

16. The core network node of claim 14, wherein the core network node is configured to receive the heartbeat signal from the active pool proxy via a Stream Control Transmission Protocol association, and wherein the Stream Control Transmission Protocol association is shared with a Gateway Control Protocol interface.

17. The core network node of claim 11, wherein the core network node is configured to convey the heartbeat signal to the passive pool proxy via a Stream Control Transmission Protocol association.

18. The core network node according to claim 17, the Stream Control Transmission Protocol association being shared with an interface for carrying control signaling to and from the radio access network node.

19. The core network node of claim 11, wherein the core network node is configured to receive the heartbeat signal from the active pool proxy via a Stream Control Transmission Protocol association.

20. A method of providing redundancy within a communication network comprising two or more pool proxies, the method comprising:
   maintaining one of the pool proxies in an active state towards the radio access network node;
   maintaining the other pool proxy in a passive state towards the radio access network node;

routing signaling traffic between a radio access network node and one of a set of pooled core network nodes via the active pool proxy;

sending a heartbeat signal from the active pool proxy to the passive pool proxy via one or more of the pooled core network nodes; and activating the passive proxy towards the radio access network node in the event that the heartbeat signal is not received at the passive proxy;

wherein the radio access network node comprises one of a Base Station Controller and a Radio Network Controller; and wherein the set of pooled core networked nodes comprises one of a set of pooled Mobile Switching Centre (MSC) Servers (MSC-Ss) and a set of pooled Serving General Packet Radio Service (GPRS) Support Nodes (SGSNs).

21. The method of claim 20, further comprising routing the heartbeat signals via the pooled core network nodes on a round robin basis.

22. The method of claim 20, wherein
the pool proxies are Mobile Switching Center pool proxies;
the pooled core network nodes are MSC-Ss; and
the radio access network node is one of a Base Station Controller and a Radio Network Controller.

23. The method of claim 22, wherein the pool proxy is implemented at a Media Gateway which communicates with Media Gateway Controller functionality implemented at the MSC-Ss.

24. The method of claim 22, further comprising sending heartbeat signals from the active pool proxy to the pooled core network node(s) over a Stream Control Transmission Protocol association shared with an interface for carrying control signaling to and from the radio access network node.

25. A method of providing redundancy within a communication network comprising two or more pool proxies routing signaling traffic between a radio access network node and one of a set of pooled core network nodes, the method comprising, at one of the pool proxies:

maintaining the proxy in a passive state towards the radio access network node;

receiving a heartbeat signal from one or more of the pooled second nodes; and activating the pool proxy towards the first node in the event that the heartbeat signal is not received; and upon activation of the pool proxy, routing signaling traffic between the radio access network node and one of the set of pooled core network nodes via the pool proxy;

wherein the radio access network node comprises one of a Base Station Controller and a Radio Network Controller; and wherein the set of pooled core networked nodes comprises one of a set of pooled Mobil Switching Centre (MSC) Servers (MSC-Ss) and a set of pooled Serving General Packet Radio Service (GPRS) Support Nodes (SGSNs).

26. A method of providing redundancy within a communication network comprising two or more pool proxies routing signaling traffic between a radio access network node and one of a set of pooled core network nodes, the method comprising, at one of the pooled core network nodes:

receive signaling from the radio access network node via an active pool proxy;

receiving a heartbeat signal from the active pool proxy; and relaying the heartbeat signal to a passive pool proxy;

wherein the set of pooled core networked nodes comprises one of a set of pooled Mobile Switching Centre (MSC) Servers (MSC-Ss) and a set of pooled Serving General Packet Radio Service (GPRS) Support Nodes (SGSNs).

27. A method of providing redundancy within a communication network comprising two or more pool proxies routing signaling traffic between a radio access neetwork node and one of a set of pooled core network nodes, the method comprising:

routing signaling between said radio access network node and said pooled core network nodes when in an active state;

sending a heartbeat signal to at least one of the pooled core network nodes for relaying to a peer pool proxy while in said active state;

receiving a heartbeat signal from the peer pool proxy relayed via at least one of the pooled core network nodes while in a passive state; and switching from said passive state to said active state when no heartbeat signal is received from said peer pool proxy, or when the received heartbeat signal does not satisfy some minimum criterion;

wherein the set of pooled core networked nodes comprises one of a set of pooled Mobile Switching Centre (MSC) Servers (MSC-Ss) and a set of pooled Serving General Packet Radio Service (GPRS) Support Nodes (SGSNs).

28. A non-transitory computer readable medium storing a computer program for controlling a pool proxy in a communication network comprising two or more pool proxies routing signaling traffic between a radio access network node and one of a set of pooled core network nodes, wherein the computer program comprises:

code for routing signaling between said radio access network node and said pooled core network nodes when in an active state;

code for sending a heartbeat signal to at least one of the pooled core network nodes for relaying to a peer pool proxy while in said active state;

code for receiving a heartbeat signal from a peer pool proxy relayed via at least one of the pooled core network nodes while in a passive state; and code for switching from said passive state to said active state when no heartbeat signal is received from said peer pool proxy, or when the received heartbeat signal does not satisfy some minimum criterion;

wherein the set of pooled core networked nodes comprises one of a set of pooled Mobile Switching Centre (MSC) Servers (MSC-Ss) and a set of pooled Serving General Packet Radio Service (GPRS) Support Nodes (SGSNs).

* * * * *